United States Patent
Briggs et al.

(10) Patent No.: US 7,254,525 B2
(45) Date of Patent: Aug. 7, 2007

(54) METHOD AND APPARATUS FOR AUTOMATED ANALYSIS OF HARD DISK DRIVE PERFORMANCE

(75) Inventors: Trevor James Briggs, Rochester, MN (US); Adam Michael Espeseth, Rochester, MN (US); Robert Anton Steinbach, Rochester, MN (US); Christopher David Wiederholt, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 714 days.

(21) Appl. No.: 10/273,310

(22) Filed: Oct. 17, 2002

(65) Prior Publication Data

US 2004/0078185 A1    Apr. 22, 2004

(51) Int. Cl.
  *G06F 9/455* (2006.01)
  *G11C 29/12* (2006.01)
(52) U.S. Cl. .................... 703/23; 703/24; 714/48; 714/702; 714/718; 714/723; 714/742; 702/115; 369/43
(58) Field of Classification Search ............. 703/22, 703/24; 379/26.01; 700/81; 714/29, 30, 714/47, 48, 702, 718, 723, 742; 702/115; 369/43
See application file for complete search history.

(56) References Cited

U.S. PATENT DOCUMENTS

| | | | | |
|---|---|---|---|---|
| 5,345,561 A * | 9/1994 | Kato | ............ | 711/112 |
| 5,615,335 A * | 3/1997 | Onffroy et al. | ............ | 714/30 |
| 5,890,219 A * | 3/1999 | Scaringella et al. | ........ | 711/162 |
| 6,058,493 A * | 5/2000 | Talley | ............ | 714/38 |
| 6,233,660 B1 * | 5/2001 | Vishlitzky | ............ | 711/154 |
| 6,385,739 B1 * | 5/2002 | Barton et al. | ............ | 714/25 |
| 6,560,569 B1 * | 5/2003 | Abu El Ata | ............ | 703/2 |
| 6,622,221 B1 * | 9/2003 | Zahavi | ............ | 711/154 |
| 6,629,448 B1 * | 10/2003 | Cvancara | ............ | 73/1.38 |
| 6,643,798 B2 * | 11/2003 | Barton et al. | ............ | 714/25 |
| 6,900,957 B2 * | 5/2005 | Gillis et al. | ............ | 360/69 |

(Continued)

OTHER PUBLICATIONS

James Jeppesen, Walt Allen, Steve Anderson, Michael Pilsl, Hard Disk Controller: the Disk Drive's Brain and Body, 2001, IEEE Computer Sciety, pp. 1-6.*

Spencer W. Ng, Advances in Disk Technology: Performance Issues, 1998 IEEE, pp. 75-81.*

(Continued)

*Primary Examiner*—Kamini Shah
*Assistant Examiner*—Kibrom K. Gebresilassie
(74) *Attorney, Agent, or Firm*—Patrick Duncan; Steven J. Cahill; James R. Nock

(57) ABSTRACT

A method and apparatus is provided which reduces the equipment and time requirements for hard disk drive performance testing during manufacturing. This invention executes self-contained performance testing code that resides within the drive's manufacturing firmware, rather than relying on external testers. The invention involves exercising the drive's enqueue, dequeue, and command execution firmware, as well as the physical process of reading and writing data by simulating the host interface in code. The invention enqueues commands that typify the desired workload, allows a command ordering algorithm to sort the commands for execution, and allows the drive side code to execute the commands just as if an external host interface were attached. The invention is advantageous because the performance testing can be done by only applying power to the drive. The present invention also lends itself to performance tuning that can be done in manufacturing, to reduce drive-to-drive performance variations.

17 Claims, 5 Drawing Sheets

U.S. PATENT DOCUMENTS

| | | | |
|---|---|---|---|
| 6,940,279 B2* | 9/2005 | Chong et al. | 324/210 |
| 7,054,790 B1* | 5/2006 | Rich | 702/186 |
| 2002/0091966 A1* | 7/2002 | Barton et al. | 714/25 |
| 2003/0163649 A1* | 8/2003 | Kapur et al. | 711/146 |
| 2003/0223315 A1* | 12/2003 | Gillis et al. | 369/13.01 |
| 2004/0044508 A1* | 3/2004 | Hoffman, Jr. | 703/13 |
| 2004/0103355 A1* | 5/2004 | Correale et al. | 714/733 |
| 2006/0227445 A1* | 10/2006 | Chiao et al. | 360/31 |

OTHER PUBLICATIONS

Soichi Ibaraki,Masayoshi Tomizuka,Tuning of a Hard Disk Drive Servo Controller Using Fixed-Structure H Controller Optimization,Sep. 2001,Transactions of the ASME,vol. 123, pp. 544-549.*

* cited by examiner

METHOD AND APPARATUS FOR AUTOMATED ANALYSIS OF HARD DISK DRIVE PERFORMANCE

FIELD OF THE INVENTION

The present invention relates generally to computer systems, and more specifically to disk drives used for mass storage of data in computer systems.

BACKGROUND OF THE INVENTION

Disk drives are well-known components of computer systems. Advances in disk drive technology have led to substantial increases in storage capacity and faster access times. Along with the increased capacity and speed, customers are also demanding consistency in drive-to-drive performance.

Original equipment manufacturers typically set specific performance requirements for drives supplied by various vendors in a given drive generation. These performance requirements generally involve a 4% to 40% generation-to-generation performance improvement for each of several specific tests. In addition to meeting these requirements, drive vendors must insure that drive-to-drive variation requirements are also met. Typically, all drives from a single HDD supplier should perform within 5% of the overall supplier's mean performance. As data densities have typically doubled each generation, the challenge of manufacturing drives that yield similar performance is receiving a great deal of attention.

In order to meet the 5% drive-to-drive performance variation requirement, vendors can either select very achievable (i.e., low performance threshold) targets and "slow down" drives that exceed these requirements, or implement performance testing and passing criteria for use in the manufacturing process. Typically, generation-to-generation improvement requirements and the goal of being the best-of-breed vendor force disk drive manufacturers to shoot for very challenging performance targets. Therefore, vendors typically do not have much extra performance margin relative to the targets and do not have the luxury of reducing performance of faster drives to lower the mean performance.

In recent hard disk drive generations, performance tests and corresponding passing criteria have been put in place for use during the manufacturing process. Drives that do not pass the criteria after manufacturing are considered manufacturing fails and count against the overall drive yields. Overall drive manufacturing yields typically range from 40% to 80% depending on the number of heads and disks contained in the disk enclosure. These performance tests insure that the drive variation requirements are met by the overall drive population. The impact of the performance tests on the overall yields vary, but a yield reduction of 5% is typical for a given drive generation.

One problem with testing performance during the manufacturing process involves the cost and time requirements. This testing procedure requires approximately ten minutes, but there are a limited number of testing slots available at a given time, so the time requirements are even more significant. In addition to the raw time requirements, the equipment required to test drives on a large scale is very costly. Performance requirements are usually set for a workload that is very susceptible to drive variations and involves a specific queue depth. In order to maintain a certain queue depth (usually 16), a relatively fast initiator system must be used. Although manufacturing testers supply one initiator system per drive, the testers and testing software typically are not optimized for performance. For example, the test suite is typically executed from a script that may not be precompiled. For this relatively slow initiator system, it is difficult to maintain the desired drive queue depth for many workloads. This makes testing some workloads very difficult. As drive performance continues to improve, this problem becomes more and more severe, thus stressing tester requirements.

Thus, there is a need for a method and apparatus for testing the performance of disk drives during manufacturing which reduces equipment and time requirements.

SUMMARY OF THE INVENTION

The present invention reduces the equipment and time requirements required for hard disk drive performance testing during manufacturing. This invention executes self-contained performance testing code that resides within the drive's manufacturing firmware, rather than relying on external testers. The invention involves exercising the drive's enqueue, dequeue, and command execution-firmware, as well as the physical process of reading and writing data by simulating the host interface in code.

The invention enqueues commands that typify the desired workload, allows a command ordering algorithm to sort the commands for execution, and allows the drive side code to execute the commands just as if an external host interface were attached. The invention is advantageous because the performance testing can be done by only applying power to the drive. The present invention also lends itself to performance tuning that can be done in manufacturing, to reduce drive-to-drive performance variations.

In a preferred embodiment, the present invention provides a method for performing in-situ performance testing of a disk drive. The method emulates data transfer operations between the disk drive and an associated computer system via a command simulation routine. The method also generates an in-situ set of read/write commands representative of a typical workload within the disk drive via a command generation routine. The method measures disk drive performance during concurrent execution of the command simulation routine and the command generation routine, and compares the measured disk drive performance results against a predefined set of performance parameters. If the measured disk drive performance results fall within a performance range defined by the predefined set of parameters, the results are logged to the disk drive. Alternatively, if the measured disk drive performance results do not fall within the performance range defined by the predefined set of parameters, operating parameters for the disk drive are tuned. In a preferred embodiment, the operating parameters are tuned by iteratively changing a set of disk drive performance settings and re-simulating the performance of the drive until the performance of the drive falls within a predetermined mean performance interval. Alternatively, the operating parameters of the disk drive may be tuned by de-tuning performance settings of the disk drive, if the results of the performance testing exceed the predetermined mean performance interval.

The present invention also provides a disk drive having a magnetic disk for storing data, and a disk drive controller/interface processor coupled to the magnetic disk for translating data and commands sent to and from the magnetic disk. The disk drive also provides a memory coupled to the disk drive controller/interface processor. The memory includes self-test firmware which is executed by the disk drive controller/interface processor during the manufacturing process in order to perform in-situ performance testing. The self-test firmware includes a command generation routine for generating an in-situ set of read/write commands representative of a typical workload for the disk drive, and a command simulation routine for emulating data transfer operations between the disk drive and an associated computer system.

The present invention further provides a computer program product having an in-situ performance testing mechanism which emulates data transfer operations between the disk drive and an associated computer system via a command simulation routine. The program product generates an in-situ set of read/write commands representative of a typical workload within the disk drive via a command generation routine, measures disk drive performance during concurrent execution of the command simulation routine and the command generation routine, then compares the measured disk drive performance results against a predefined set of performance parameters. The computer program product further includes computer-readable signal bearing media bearing the in-situ performance testing mechanism.

DETAILED DESCRIPTION OF THE PREFERRED EMBODIMENTS

Figure 1:
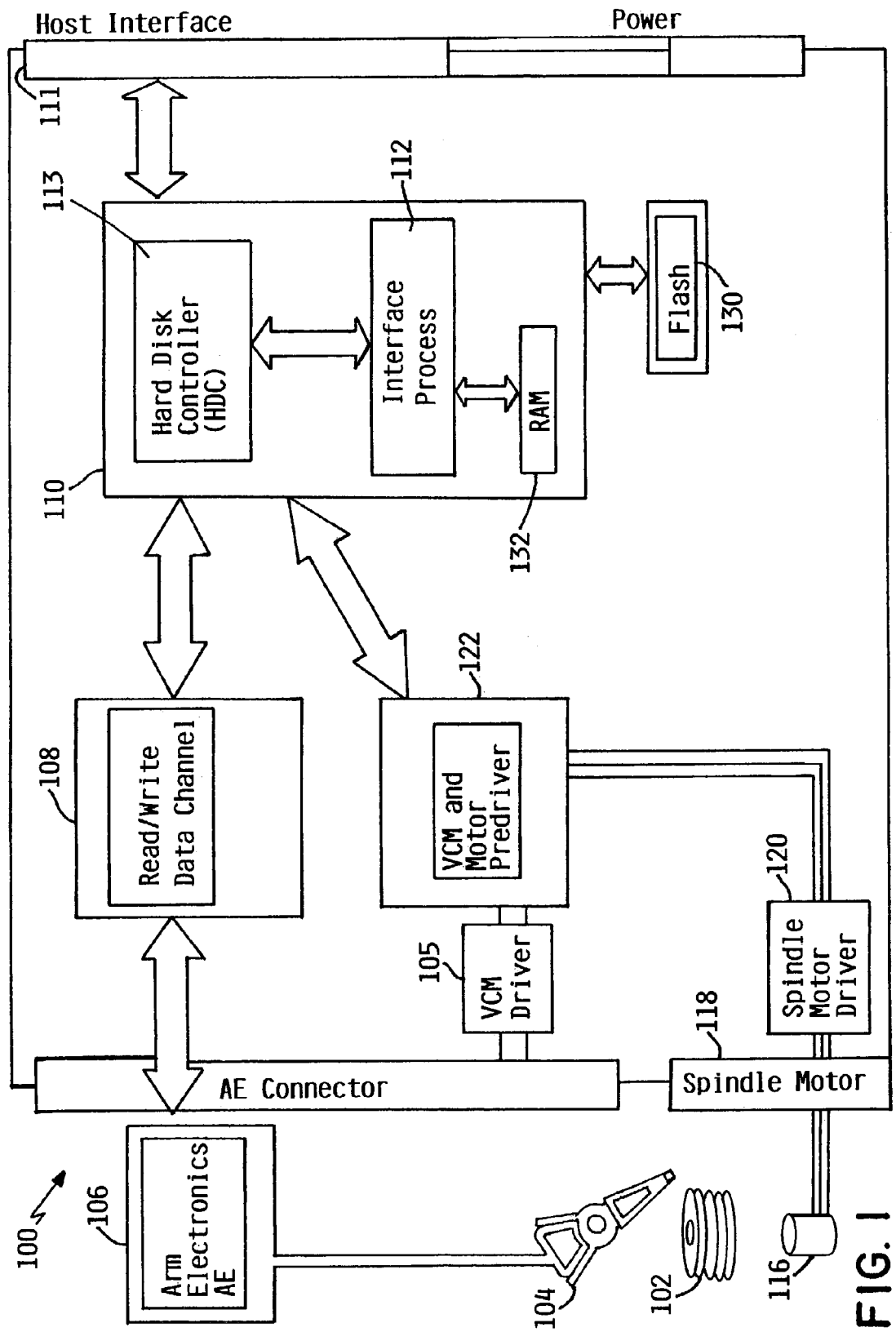
FIG. 1 is a block diagram of the electronics architecture for a typical hard disk drive system in accordance with the present invention.

Turning to the Drawings, wherein like numbers denote like parts throughout the several views, FIG. 1 is a block diagram of the electronics architecture for a typical hard disk drive system in accordance with the present invention, shown generally at 100. Indeed, those skilled in the art will recognize that other alternative embodiments may be used without departing from the scope and spirit of the present invention.

Drive system 100 includes a disk stack 102 where customer data is magnetically stored and retrieved. Disk stack 102 is a circular-shaped data-storage medium that stores data on the flat surface of the platter as magnetic patterns in a metal coating. An actuator 104 is the internal mechanism that moves a read/write head to the proper position on the disk stack 102 to read/write customer data. Actuator 104 typically consists of a rotary voice coil and the head mounting arms. One end of each head mounting arm attaches to the rotor with the read/write heads attached at the opposite end of each arm. As current is applied to the rotor from Voice Coil Motor (VCM) driver 105, the actuator rotates, positioning the read/write heads over the desired cylinder on the media.

Actuator 104 is coupled to a read/write data channel 108 via arm electronics 106. Arm electronics 106 drive the write heads on actuator 104 with the proper write current, and amplify the read signal obtained by the read heads. Read/write data channel 108 provides a conversion of the analog signals provided by arm electronics 106 to a digital data stream and vice-versa. Read/write data channel 108 is coupled to a controller/processor 110. Controller/processor 110 is the chip or circuit that translates computer data and commands into a form suitable for use by the hard drive and vice-versa. Controller/processor 110 includes a hard disk controller 113, which controls the general operation of the disk drive.

Controller/processor 110 also includes an interface processor 112 which executes firmware for managing the hardware components to provide hard disk drive functions and interprets requests from an initiator (e.g., computer system) and controls the handling of these requests. Interface processor 112 executes special self-test performance testing firmware (an object of the present invention) during the manufacturing process to analyze and potentially tune the disk drive's performance characteristics. An initiator (e.g., computer system), not shown, is coupled to controller/processor 110 via host interface 111. A flash memory 130 coupled to controller/processor 110 contains interface processor instructions executed by the interface processor 112. In the case of the present invention, the self-test performance testing firmware is stored in memory (e.g., flash memory 130). A data buffer (DRAM) 132 coupled to controller/processor 110 contains variables and tables used by the controller/processor.

Spindle 116 is a rotating hub structure to which disk stack 102 is attached. Spindle motor 118 is the electro-mechanical part of the disk drive that rotates disk stack 102 via spindle 116. Spindle motor driver 120 is coupled to spindle motor 118 for driving its operation. Both spindle motor driver 120 and voice coil motor driver 105 are coupled to a VCM and Motor Predriver 122, which in turn is coupled to controller/processor 110. VCM and Motor Predriver 112 powers both spindle motor driver 120 and voice coil motor driver 105, and provides spindle motor commutation.

Figure 2A:
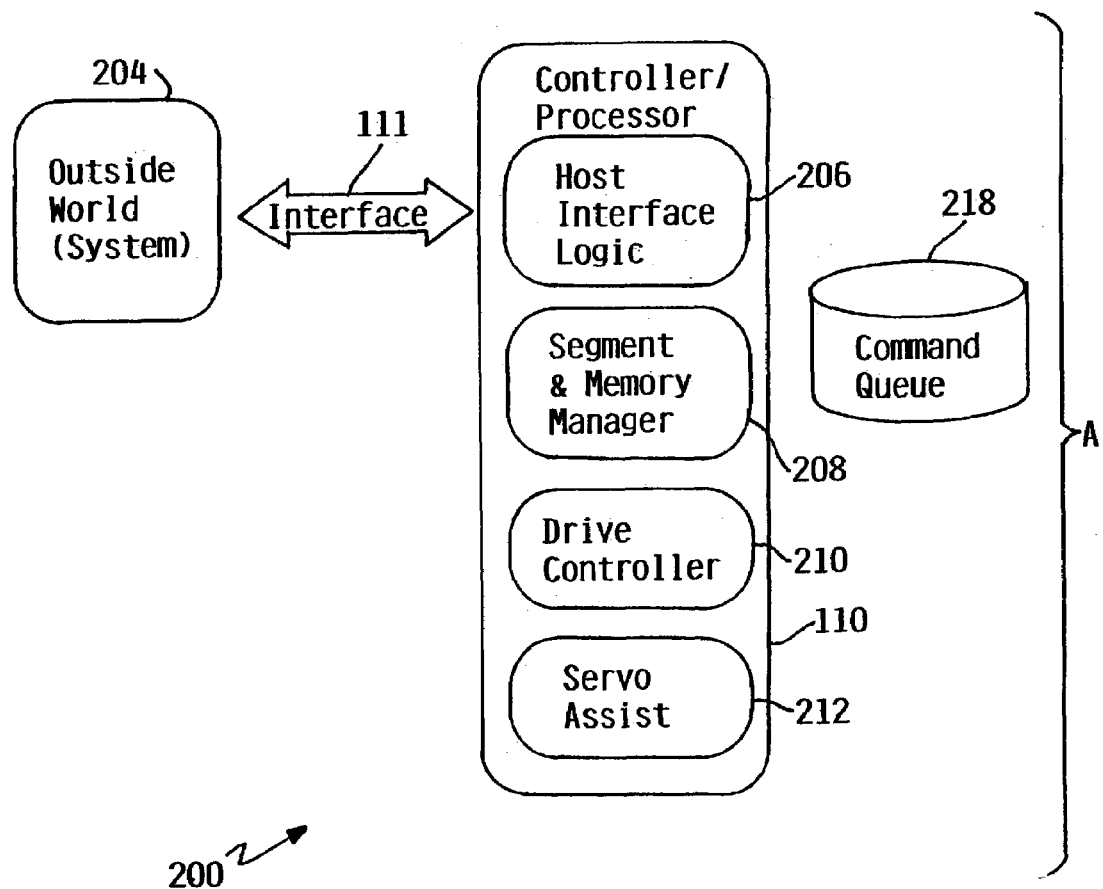
FIG. 2A illustrates a block diagram of a hard disk drive firmware/hardware system, in accordance with the present invention.
Figure 2B:
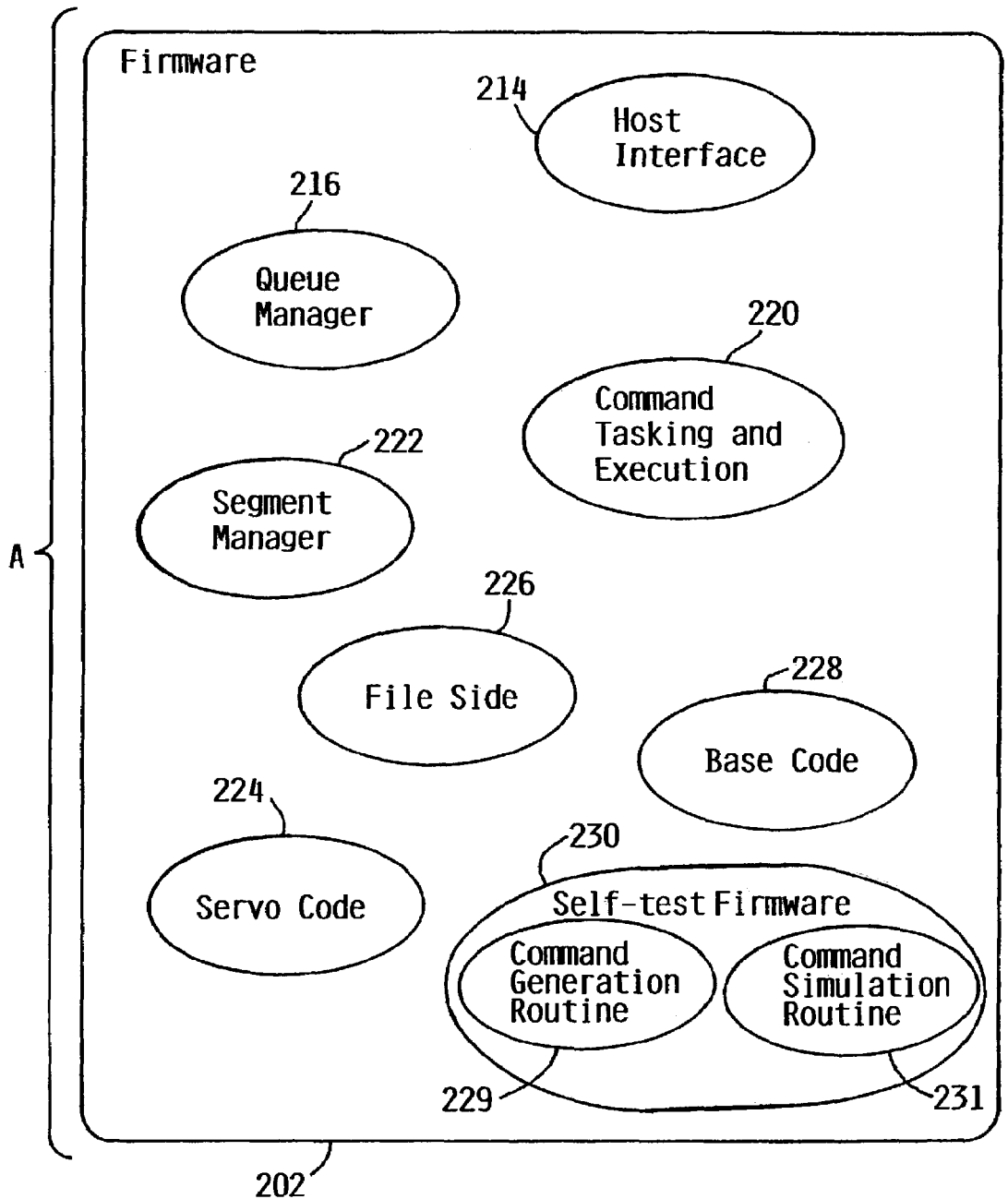
FIG. 2B illustrates a block diagram of a hard disk drive firmware/hardware system, in accordance with the present invention.

FIG. 2A illustrates a block diagram of a hard disk drive firmware/hardware system, in accordance with the present invention, shown generally at 200. Disk system 200 includes the controller/processor hardware 110 previously illustrated in FIG. 1, along with associated firmware 202 (shown in detail in FIG. 2B) residing in flash memory 130. Controller/processor 110 is coupled to the outside world (i.e., a computer system/initiator) 204 via host interface 111.

Controller/processor 110 includes host interface logic 206 for managing communication between the controller/processor 110 and the computer system 204 via host interface 111. Controller/processor 110 further includes a segment & memory manager 208 for managing customer DRAM and maintaining the cache table. Controller/processor 110 also includes a drive controller 210 and servo assist hardware 212 which is responsible for actuator movements and managing motor control.

Included within system firmware 202 is host interface firmware 214. Typically, host interface firmware 214 is responsible for managing communication between the hard disk drive and the computer system (initiator) 204. Host interface firmware 214 also provides support for interface functions, and supports command reception and notification to the queue manager. Queue manager firmware 216 is responsible for management of command queue 218, more specifically enqueue, reordering, dequeue, abort handling, and other miscellaneous handling functions.

Command tasking and execution firmware 220 is responsible for scheduling what task the code does next. Segment manager firmware 222 is responsible for managing customer DRAM, interfaces with segment & memory manager hardware 208, and maintains cache tables. Servo code firmware 224 is treated as a black box to the interface processor code and is responsible for actuator movements and managing motor control. File side code firmware 226 is responsible for managing back-end hardware (i.e., interfaces to the hard disk drive logic and channel), manages read/write operations between the media and the buffer, and provides special command support for manufacturing, channel integration, and failure analysis. Base code firmware 228, the largest area of the code, is responsible for a number of responsibilities, including: memory mapping, reserved area layout and usage, power-on sequence (i.e., boot-up), command handlers, idle function, and error logging.

Self-test performance testing firmware 230, an object of the present invention, is used during the manufacturing process to analyze and potentially tune the disk drive's performance characteristics in-situ. More simply, self-test performance testing firmware 230 enables the disk drive to execute entirely self-contained performance testing procedures without the need for any external testers/initiators. This self-test performance testing firmware 230 is typically replaced by the released firmware level at the end of the manufacturing process. However, there may be occasion to utilize self-test performance testing firmware after the manufacturing process as well.

Self-test firmware 230 exercises the disk drive's enqueue, dequeue, and command execution firmware 220, as well as exercising the physical process of reading and writing data by simulating the normal function of host interface logic 206/host interface firmware 214 in code. Self-test firmware 230 includes two special routines, a command generation routine 229 and a command simulation routine 231. Command simulation routine 231 includes a special set of in-situ host interaction emulation functions 231 to simulate data transfers to and from a host system. Command simulation routine 231 essentially replaces host interface firmware 214 during this manufacturing self-test procedure. Command generation routine 229 generates commands that are representative of the desired workload, then queue manager 216 places the commands in the disk drive's command queue 218. The commands are then sorted by a Rotational Position Ordering (RPO) algorithm, and executed normally. To insure an accurate performance representation, the normal code execution paths are used wherever possible. Host interactions (data transfers, command status, etc.) are handled with special functions specific to the invention.

Workload information and performance criteria are stored in self-test firmware 230. The disk drive runs the performance workload (e.g., 1 block random reads in a 2 gigabyte partition at queue depth 16) and tracks the performance throughout the test. In a preferred embodiment of the present invention, the performance metric is operations-per-second, but other performance metrics may be utilized, and still remain within the scope and spirit of the present invention.

Self-test firmware 230 then compares the performance metric against the predefined values contained within the self-test firmware to determine if the performance requirements are met. If the requirements are met, the disk drive logs this information and these logs can be read in a later stage of the manufacturing process that involves an initiator system.

At the conclusion of the performance test, self-test firmware 230 may also select from a predefined list of alternate performance parameters if the performance criteria is not met. In this instance, self-test firmware 230 re-initiates the self-test performance routine for each set of parameters until either the requirements are met, or the list is exhausted.

Thus, the present invention uses special routines to replace interactions with an initiator (e.g., computer system) and data transfers across the drive's host interface. These routines simulate the host interface and the behavior of the initiator system as closely as possible. Aside from these special routines, all code execution paths remain the same.

At this point, it is important to note that while the present invention has been and will continue to be described in the context of firmware present within a fully functional disk drive system, those skilled in the art will appreciate that the present invention is capable of being distributed as a program product in a variety of forms, and the present invention applies equally regardless of the particular type of signal bearing media used to actually carry out the distribution. Examples of suitable signal bearing media include, but are not limited to: recordable type media such as floppy disks, CD ROM, memory cards, chips, modules, sticks, and transmission type media such as digital and analog communications links.

Figure 3:
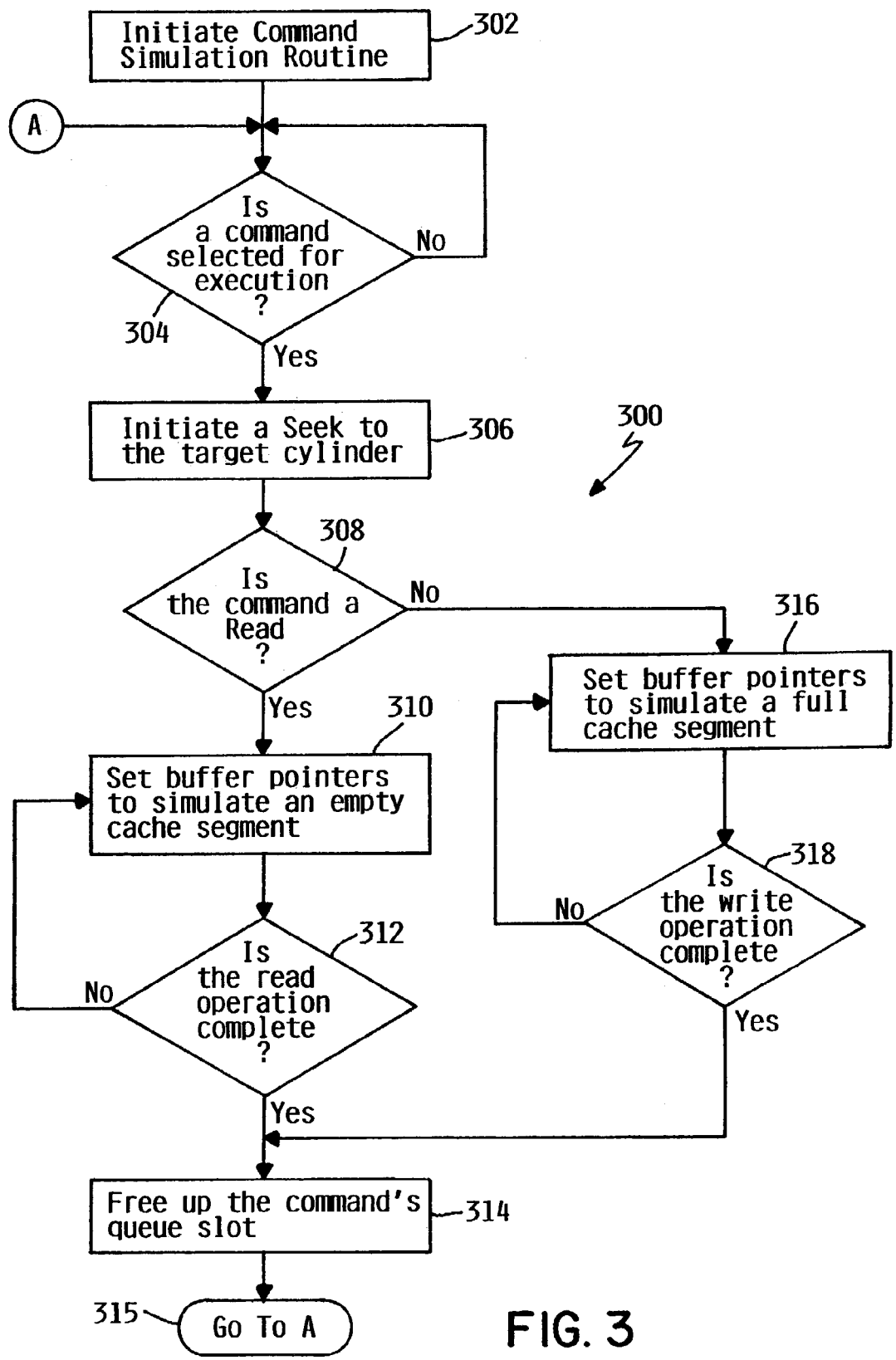
FIG. 3 is a flow diagram of a command simulation routine in accordance with the present invention.
Figure 4:
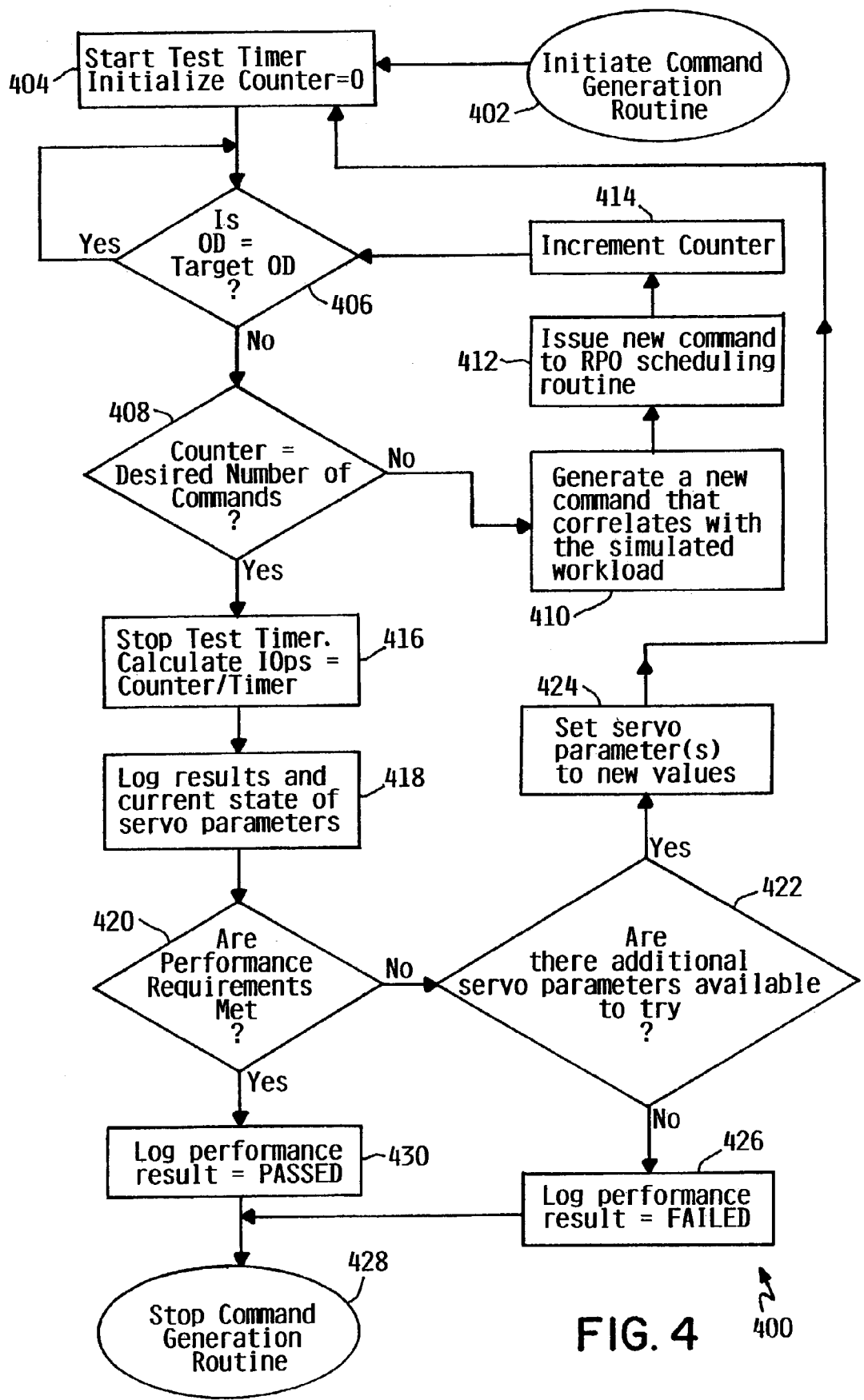
FIG. 4 is a flow diagram of command generation routine in accordance with the present invention.

As described previously, two main routines are required to implement this invention: command generation routine 229 (shown in detail in FIG. 3), and command simulation routine 231 (shown in detail in FIG. 4). Both command generation routine 229 and command simulation routine 231 are initiated at the start of the performance simulation and are continuously run in separate threads of execution.

Once the special firmware that contains the invention (i.e., self-test firmware 230) is loaded onto the drive, both command generation routine 229 and command simulation routine 231 may be initialized on either the next power cycle or immediately after the download. Command generation routine 229 generates a read and/or write command that otherwise would have been received from a host system. These commands are used to simulate workloads that are deemed to exhibit the highest drive-to-drive variation. These commands will be enqueued to the RPO command scheduling routine. RPO will operate normally to select the optimal command from the list of outstanding queued commands. Once RPO selects a command for execution, a seek to the target location is performed by the drive-side firmware. While this seek is being performed, command simulation routine 231 simulates a host transfer.

Command generation routine 229 generates commands that are representative of the desired workload and places them in the disk drive's command queue 218. Command generation routine 229 is responsible for maintaining the desired queue depth, or number of outstanding commands, and calculating the overall execution time during the test. This routine determines if the drive passed or failed the test by comparing the actual results with predefined values. If the drive fails the test, command generation routine 229 can change drive parameters and re-start the testing process. All test results are logged.

Command simulation routine 231 is a simple routine that simulates host transfers by modifying the hard disk controller's buffer pointer registers. This serves to replace the host-side data transfers. FIG. 3 is a flow diagram of command simulation routine 231, shown generally at 300. At block 302, the command simulation routine is initiated. At block 304, the routine waits for a command to be selected for execution. After a command has been selected for execution, a seek is initiated within the disk drive to a target sector, as shown at block 306. At block 308, it is determined whether the selected command is a read command or a write command.

If the command is a read command, the command simulation routine 231 sets the host buffer pointer registers such that the drive-side firmware sees buffer space available for the disk transfer, as shown at block 310. The routine continues to modify the buffer pointer registers during the disk transfer, such that the drive-side code completes the disk transfer in a single operation, as shown at block 312. For read operations, the actual read data is discarded. Since the data transfer across the host interface represents a relatively insignificant amount of time compared to the execution time of the disk operation, it can be ignored. However, if more precision is required, delays can be added in both command simulation routine 231 and command generation routine 229 to more accurately model the host interface behavior. Once the disk transfer is complete, this routine shall free the queue slot for a new command, as shown at block 314. After the queue slot has been freed, control transfers back to block 304, where the routine waits for a new command to be selected for execution, as shown at block 315.

If the command is a write command, the command simulation routine 231 sets the host buffer pointer registers such that a full cache segment is simulated, as shown at block 316. During the disk transfer, the routine continues to modify the host buffer pointers to simulate the operation of the host interface data transfer, as shown at block 318. At the completion of the disk transfer, the routine frees the command's queue slot for a new command, as shown at block 314. After the queue slot has been freed, control transfers back to block 304, where the routine waits for a new command to be selected for execution.

FIG. 4 is a flow diagram of command simulation routine 229, shown generally at 400. The command simulation routine 229 is initiated at block 402. At block 404, a test timer is initiated, and a command counter is initialized to zero. At block 406, it is determined if the current queue depth is equal to the target queue depth. Control passes to block 408 only when the current queue depth is not equal to the target queue depth. At block 408, it is determined if the desired number of commands have been executed, by comparing the command counter against a variable containing the desired number of commands. If the command counter has not reached the desired number of commands, control passes to block 410 where a new command is generated that correlates with the simulated workload. At block 412, this new command is issued to the RPO scheduling routine, and the command counter is incremented at block 414. After the command counter is incremented, control passes back to block 406, where it is once again determined if the current queue depth is equal to the target queue depth.

If, at block 408, the command counter indicates that the desired number of commands have been executed, control passes to block 416, where the test timer is stopped. The routine then calculates a performance metric (e.g., the number of I/O operations per second). At block 418, the performance results are logged. The current servo parameter values which generated this performance metric are also logged.

At block 420, it is determined if the test results indicate that the drive meets performance requirements. If not, control passes to block 422 where it is determined if there are any other servo parameter values that can be applied to the drive. If so, control passes to block 424, where the servo parameters are set to the new values, and control then passes back to block 404, where the test timer and command counter are re-initiated for the start of a new test. If all possible servo parameters have been exhausted, control passes to block 426, where a log entry is written indicating that the drive has failed the performance test, and the command generation routine is terminated at block 428.

If, at block 420, it is determined that the test results indicate that the drive meets performance requirements, control passes to block 430, where the successful result for the performance test is logged, and the command generation routine is then terminated at block 428.

Additional modifications may be made to the illustrated embodiments without departing from the spirit or scope of the invention. Therefore, the invention lies in the claims hereinafter appended.

What is claimed is:

1. A method for performing in-situ performance testing of a disk drive, the method comprising the steps of:
   emulating data transfer operations between the disk drive and an associated computer system via a command simulation routine;
   generating an in-situ set of read/write commands representative of a typical workload within the disk drive via a command generation routine to test command execution firmware of the disk drive;
   measuring disk drive performance results during concurrent execution of the command simulation routine and the command generation routine;
   determining if the disk drive performance results meet performance parameters;
     if the disk drive performance results do not meet the performance parameters, automatically identifying a set of new servo parameter values to apply to the disk drive in each subsequent iteration of in-situ tests of the disk drive;
     setting servo parameters of the disk drive to the new servo parameter values;
     iteratively performing additional in-situ tests of the disk drive using the command simulation routine for each set of the new servo parameter values;
     logging the disk drive performance results if the disk drive performance results fall within a performance range defined by the performance parameters; and
     marking the disk drive as a failed drive if the disk drive performance results fail to fall within a predetermined mean performance interval.

2. The method of claim 1, further comprising the step of:
   de-tuning operating parameters of the disk drive, if the results of the performance testing exceed a predetermined mean performance interval.

3. The method of claim 1, wherein the command simulation routine resides in firmware within the disk drive.

4. The method of claim 1, wherein the command generation routine resides in firmware within the disk drive.

5. The method of claim 1, further comprising:
   initiating the in-situ performance testing of the disk drive without initiation from an external tester.

6. The method of claim 1, wherein the in-situ set of read/write commands are chosen to exhibit the greatest amount of drive-to-drive performance variation.

7. The method of claim 1, wherein the step of emulating data transfer operations between the disk drive and an associated computer system via a command simulation routine comprises the steps of:
   selecting a command for execution;
   initiating a seek to the target cylinder on the disk drive for the selected command;
   if the command is a read command, setting buffer pointer registers to simulate an empty cache segment until the read operation is complete;

if the command is a write command, setting buffer pointer registers to simulate a full cache segment until the write operation is complete;

freeing the command's queue slot; and repeating the above steps for a newly selected command.

8. The method of claim 1, wherein the step of measuring the disk drive performance results further comprises the steps of:

starting a test timer; generating a fixed number of read/write commands, the read/write commands being submitted to a Rotational Position Ordering (RPO) scheduling routine;

stopping the test timer; dividing the fixed number of read/write commands by the elapsed time measured by the test timer in order to generate a performance metric; and logging the performance metric and current servo parameter value settings to the hard drive.

9. The method of claim 8, wherein the performance metric is operations per second.

10. An apparatus for performing in-situ performance testing of a disk drive during a manufacturing process, the apparatus comprising:

a disk drive controller/interface processor for translating data and commands sent to and from the disk drive;

a memory coupled to the disk drive controller/interface processor, the memory including self-test firmware which is executed by the disk drive controller/interface processor during the manufacturing process to perform in-situ performance testing;

a command generation routine residing within self-test firmware for generating an in-situ set of read/write commands representative of a typical workload for the disk drive to test command execution firmware of the disk drive;

a command simulation routine for emulating data transfer operations between the disk drive and an associated computer system;

a routine for measuring disk drive performance results during concurrent execution of the command simulation routine and the command generation routine;

a routine for determining if the disk drive performance results meet performance parameters, and if the disk drive performance results do not meet the performance parameters, then automatically identifying a set of new servo parameter values to apply to the disk drive in each subsequent iteration of in-situ tests of the disk drive, setting servo parameters of the disk drive to the new servo parameter values, and iteratively performing in-situ tests of the disk drive using the command simulation routine for each set of the new servo parameter values; and a routine for logging the disk drive performance results if the disk drive performance results fall within a performance range defined by the performance parameters, and marking the disk drive as a failed drive if the disk drive performance results fail to fall within a predetermined mean performance interval.

11. The apparatus of claim 10, wherein the self-test firmware resides within manufacturing firmware.

12. The apparatus of claim 11, wherein the manufacturing firmware is replaced by release firmware at the end of the manufacturing process.

13. A disk drive, comprising:

a magnetic disk for storing data;

a disk drive controller/interface processor coupled to the magnetic disk for translating data and commands sent to and from the magnetic disk;

a memory coupled to the disk drive controller/interface processor, the memory including self-test firmware which is executed by the disk drive controller/interface processor during a manufacturing process to perform in-situ performance testing;

a command generation routine residing within self-test firmware for generating an in-situ set of read/write commands representative of a typical workload for the disk drive to test command execution firmware of the disk drive;

a command simulation routine for emulating data transfer operations between the disk drive and an associated computer system;

a routine for measuring disk drive performance results during concurrent execution of the command simulation routine and the command generation routine;

a routine for determining if the disk drive performance results meet performance parameters, and if the disk drive performance results do not meet the performance parameters, then automatically identifying a set of new servo parameter values to apply to the disk drive in each additional iteration of in-situ tests of the disk drive, setting servo parameters of the disk drive to the new servo parameter values, and iteratively performing additional in-situ tests of the disk drive using the command simulation routine for each set of the new servo parameter values; and a routine for logging the disk drive performance results if the disk drive performance results fall within a performance range defined by the performance parameters, and marking the disk drive as a failed drive if the disk drive performance results fail to fall within the performance range.

14. The apparatus of claim 13, wherein the self test firmware resides within manufacturing firmware.

15. The apparatus of claim 14, wherein the manufacturing firmware is replaced by release firmware at the end of the manufacturing process.

16. A program product stored on a recordable media, comprising wherein the program product comprises:

an in-situ performance testing mechanism for a disk drive during a manufacturing process that emulates data transfer operations between the disk drive and an associated computer system via a command simulation routine, generates an in-situ set of read/write commands representative of a typical workload within the disk drive via a command generation routine to test command execution firmware of the disk drive, measures disk drive performance results during concurrent execution of the command simulation routine and the command generation routine, determines if the disk drive performance results meet performance parameters, and if the disk drive performance results do not meet the performance parameters, automatically identifies a set of new servo parameter values to apply to the disk drive in each iteration of in-situ tests of the disk drive, sets servo parameters of the disk drive to the new servo parameter values, and iteratively performs in-situ tests of the disk drive using the command simulation routine for each set of the new servo parameter values, wherein the in-situ performance testing mechanism logs the disk drive performance results if the disk drive performance results fall within a performance range defined by the performance parameters, and marks the disk drive as a failed drive if the disk drive performance results fail to fall within a predetermined mean performance interval.

17. The program product of claim 16, wherein the recordable media comprises flash memory.

* * * * *